(12) United States Patent
Bierie et al.

(10) Patent No.: US 10,589,309 B2
(45) Date of Patent: Mar. 17, 2020

(54) SPRAYER ADAPTER

(71) Applicant: Carlisle Fluid Technologies, Inc., Charlotte, NC (US)

(72) Inventors: William K. Bierie, Liberty Center, OH (US); Marvin D. Burns, Millbury, OH (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 774 days.

(21) Appl. No.: 15/047,503

(22) Filed: Feb. 18, 2016

(65) Prior Publication Data

US 2016/0243574 A1 Aug. 25, 2016

Related U.S. Application Data

(60) Provisional application No. 62/118,993, filed on Feb. 20, 2015.

(51) Int. Cl.
*B05B 7/24* (2006.01)
*B05B 15/65* (2018.01)
*F16L 25/14* (2006.01)
*F16L 15/06* (2006.01)

(52) U.S. Cl.
CPC .............. *B05B 15/65* (2018.02); *F16L 15/06* (2013.01); *F16L 25/14* (2013.01); *B05B 7/2408* (2013.01); *B05B 7/2416* (2013.01); *B05B 7/2478* (2013.01); *B05B 7/2491* (2013.01)

(58) Field of Classification Search
CPC ... B05B 11/0008; B05B 11/0013; B05B 7/24; B05B 7/30

USPC ........ 239/376, 379; 285/219, 220, 221, 393, 285/260, 195, 143.1
See application file for complete search history.

(56) References Cited

U.S. PATENT DOCUMENTS

| 234,710 | A | * | 11/1880 | Heitzelman | 285/220 |
| 477,308 | A | * | 6/1892 | McFarland | 285/220 |
| 802,363 | A | * | 10/1905 | Helleur | 285/219 |
| 1,006,008 | A | * | 10/1911 | Ross | B67B 7/26 222/573 |
| 1,618,720 | A | * | 2/1927 | Moore | B67B 7/26 222/91 |
| 2,760,824 | A | * | 8/1956 | Leadbetter | B05B 15/658 239/272 |
| 3,650,551 | A | * | 3/1972 | Akers | F16L 3/16 285/143.1 |

(Continued)

FOREIGN PATENT DOCUMENTS

| CN | 200945466 Y | 9/2007 |
| CN | 203152174 U | 8/2013 |
| GB | 1376164 A | 12/1974 |

OTHER PUBLICATIONS

International Search Report for PCT/US2016/018742 dated May 2, 2016; 7 pages.

*Primary Examiner* — David Bochna
(74) *Attorney, Agent, or Firm* — Fletcher Yoder, P.C.

(57) ABSTRACT

A system includes a spray-component adapter. The spray-component adapter includes a first connector configured to couple the spray-component adapter to a first fluid port of a first spray component. The spray-component adapter includes a second connector configured to couple the spray-component adapter to a second fluid port of a second spray component. At least one of the first or second connectors comprises a self-tapping portion.

20 Claims, 6 Drawing Sheets

(56) References Cited

U.S. PATENT DOCUMENTS

| | | | |
|---|---|---|---|
| 3,767,121 A * | 10/1973 | Campbell | A01G 25/023 |
| | | | 239/272 |
| 4,265,404 A | 5/1981 | Hunter | |
| 5,203,082 A | 4/1993 | Bontems | |
| 6,449,975 B1 | 9/2002 | Moreno | |
| 6,609,733 B2 * | 8/2003 | Gilmore | B01F 5/0451 |
| | | | 138/40 |
| 6,712,292 B1 | 3/2004 | Gosis et al. | |
| 6,871,880 B1 * | 3/2005 | Olson | A01G 25/023 |
| | | | 285/192 |
| 7,757,972 B2 | 7/2010 | Kosmyna et al. | |
| 2004/0251269 A1 | 12/2004 | Gosis et al. | |
| 2006/0103131 A1 | 5/2006 | Masarwa et al. | |
| 2008/0035759 A1 | 2/2008 | Burns | |
| 2008/0079258 A1 | 4/2008 | Siegel et al. | |
| 2008/0084063 A1 * | 4/2008 | Hamilton | F16L 41/10 |
| | | | 285/219 |
| 2011/0180632 A1 | 7/2011 | Shkolnikov et al. | |
| 2012/0006913 A1 | 1/2012 | Burns | |
| 2013/0233944 A1 | 9/2013 | Burns | |
| 2013/0292493 A1 | 11/2013 | Marsalek et al. | |
| 2014/0203098 A1 | 7/2014 | Bierie | |
| 2014/0353395 A1 | 12/2014 | Charpie et al. | |
| 2014/0361099 A1 | 12/2014 | Marsalek et al. | |

\* cited by examiner

US 10,589,309 B2

SPRAYER ADAPTER

CROSS REFERENCE TO RELATED APPLICATION

This application claims priority to and benefit of U.S. Provisional Patent Application No. 62/118,993, entitled "Sprayer Adapter", filed Feb. 20, 2015, which is herein incorporated by reference in its entirety.

BACKGROUND

The subject matter disclosed herein relates to sprayers, and more particularly, to an adapter to connect a source to a sprayer.

Sprayers, such as spray guns, are used to apply a spray coating to a wide variety of target objects. Such sprayers are typically coupled to a fluid source (e.g., a paint cup) and an air source. For a variety of reasons, it may become desirable to use a different fluid or air source. For instance, an operator may desire to use a newer, better, or more affordable fluid container than the previous fluid container. Unfortunately, fluid containers may not connect to some sprayers. For example, a fluid container may have a connector that is unable to connect with a sprayer.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a spray-component adapter, including a first connector configured to couple the spray-component adapter to a first fluid port of a first spray component, and a second connector configured to couple the spray-component adapter to a second fluid port of a second spray component, wherein at least one of the first or second connectors comprises a self-tapping portion.

In a second embodiment, a system including at least one spray component comprising at least a portion of a fluid source, a sprayer, or a combination thereof, and a spray-component adapter comprising a first connector, a second connector, and a fluid passage extending between the first and second connectors, wherein at least one of the first or second connectors comprises a self-tapping portion configured to couple the spray-component adapter to a fluid port of the at least one spray component.

In a third embodiment, a method includes coupling a fluid source to a sprayer using a spray-component adapter having a self-tapping portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
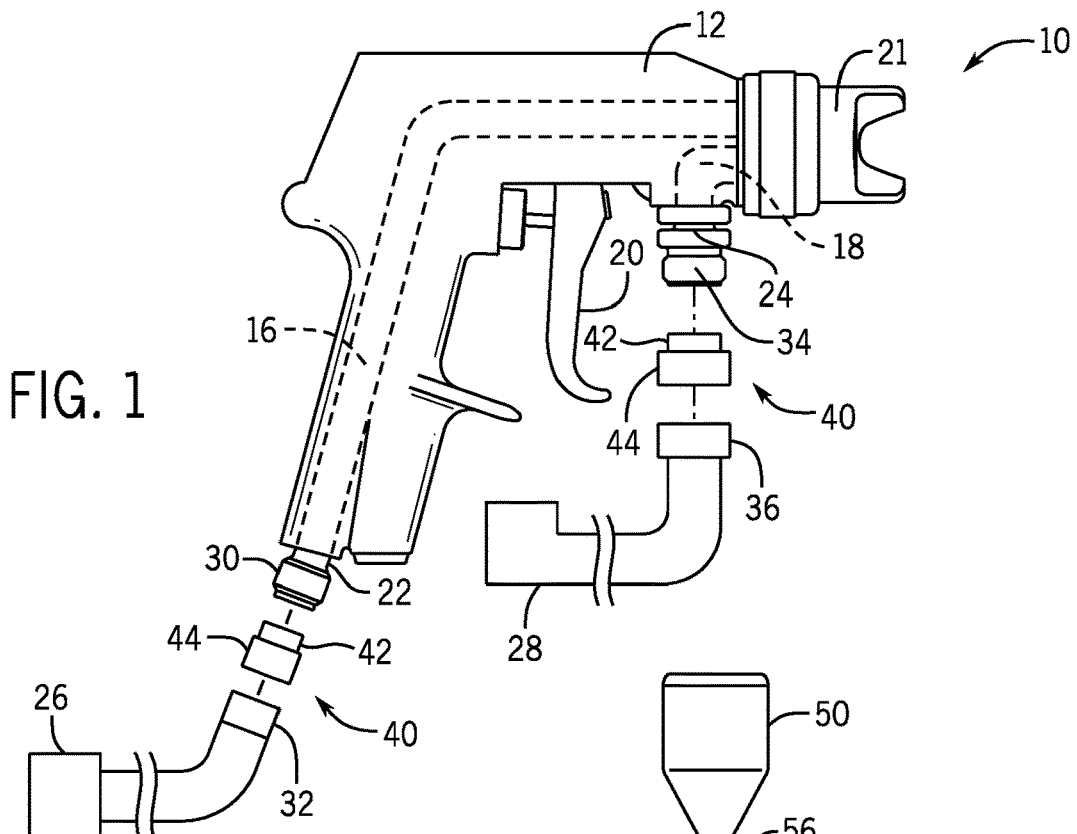
FIG. 1 is a side view of an embodiment of a sprayer system with an adapter.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to an adapter configured to couple first and second spray components (e.g., a sprayer and a fluid source) that are otherwise unable to couple together, e.g., due to different types of couplings. The sprayer may be a handheld manual spray gun, an automated spray unit (e.g., a robotic mounted spray unit), a spray booth mounted spray unit, or any other suitable spray device. The sprayer also may include a pneumatic driven spray device, which uses a gas (e.g., air) to help atomize a liquid, shape a spray of the liquid, operate a valve of the sprayer, or a combination thereof. The sprayer may include a rotary bell cup, which rotates a bell cup to help create a spray. The sprayer may include an electrostatic spray device, which generates an electric field to help attract a spray onto a target object. Furthermore, the sprayer may be a spray coating device configured to produce a spray of a coating material, such as paint, for creating a coating on a surface of an object. The fluid source may include a fluid conduit, a fluid container (e.g., a gravity feed fluid container, a siphon feed fluid container, a multi-fluid feed container), or any combination thereof. The adapter may be used to facilitate connections with the fluid source and any connections on the sprayer, such as fluid couplings on a handle, a body, a spray head, or any combination thereof.

More particularly, the adapter may include one or more self-tapping features (e.g., a self-tapping adapter) that connects a sprayer to an existing fluid source (e.g., liquid source, powder source, and/or gas source such as air) that has a different connection. In other words, the adapter bypasses an existing connection type (e.g., non-threaded connection, interference fit connection, quick-fit connection, etc.) in order to couple to the sprayer and/or the fluid source. The adapter includes first and second connectors with the first connector coupling to the sprayer and the second connector coupling to the fluid source. The first connector and/or the second connector of the adapter may be equipped with a self-tapping portion (e.g., one or more self-tapping features) for coupling the adapter to the sprayer and/or the fluid source. In other words, either one or both ends of the adapter may include the self-tapping portion, such that the adapter can self-tap into the sprayer, the fluid source, or both. The self-tapping portion may include a variety of self-tapping features, such as a self-tapping tip, self-tapping threads, or a combination thereof. The self-tapping tip may include a drill-bit type feature (e.g., a self-drilling feature), a cutting tip, a tapered tip with cutting features, or any combination thereof. The self-tapping threads may include discontinuous threads (e.g., threads with intermediate breaks), variations in the geometry of the threads along the length of the threads, or any combination thereof. For example, the thread may periodically change in height, width, shape, angle, sharpness, or continuity along the length of the thread. These features may facilitate self-tapping the adapter into the sprayer and/or the fluid source.

In some embodiments, sprayers with various inlets may be configured to receive (e.g., have soft material, smooth interiors, smooth exteriors, etc.) the self-tapping portion, thereby enabling the use of similar (e.g., identical) adapters for different sprayers. If, for example, the air inlet or fluid inlet may have an air connection or fluid connection that is non-threaded (e.g., a bare cylinder), the inlet may receive both a fitted source (e.g., fitted to match the sprayer inlet) and another source by using the adapter in place of the fitted source. Alternatively and/or additionally, different size inlets may utilize the similar adapters because of the tapered profiles or tapered seal. Further, by self-tapping, the adapter may create a better seal with the sprayer. In some embodiments, by utilizing a self-tapping adapter, the sprayer and/or the fluid source may be coupled to the adapter without additional tools. In other embodiments, the adapter allows for the ability to retrofit an existing sprayer with an existing air or fluid source that has different connections. In certain embodiments, the adapter may self-tap into fluid connections of a relatively softer material than the adapter, such as plastic or softer metal (e.g., aluminum, tin, copper, brass, lead, or bronze). Therefore, the adapter (or at least the self-tapping features) may be made of a relatively harder material than the material of the fluid connection on the sprayer and/or the fluid source. In certain embodiments, the portion of the sprayer and/or the fluid source having the connection to receive the adapter may be disposable, e.g., a disposable fluid container, a disposable fluid container cover, a disposable conduit, a disposable spray head, a disposable spray gun, or any combination thereof.

FIG. 1 is a side view of a sprayer system 10 including a spray component, such as a sprayer 12 for spraying a coating (paint, ink, varnish, etc.). The sprayer 12 may be any spray coating device (e.g., gravity-feed, siphon, high-volume low-pressure, or pressure) suitable for spraying coatings. The sprayer 12 includes a variety of passages, such as an air passage 16 and a fluid passage 18. In operation, a trigger 20 or other suitable control may send air and fluid through the air passage 16 and fluid passage 18 of the sprayer 12 enabling release of an air-fluid mixture through the nozzle 21.

The sprayer 12 may include an air inlet 22 and a fluid inlet 24 to receive air and fluids into the air passage 16 and the fluid passage 18 of the sprayer 12. The air inlet (i.e. port) 22 and the fluid inlet (i.e. port) 24 may be coupled to one or more spray components, such as an air source 26 and a fluid source 28. For example, the air inlet 22 may couple to an air compressor or an air reservoir (e.g., air tank). The air inlet 22 may couple to the air source 26 using a variety of connections. For instance, the air inlet 22 may include a connector 30 (e.g., male) and the air source 26 may include corresponding connector 32 (e.g., female). In some embodiments, the air inlet 22 may be a female connector 30 and the air source 26 may be a male connector 32. Similarly, the fluid inlet 24 may couple to the fluid source 28 (e.g., paint mixer), such as a fluid reservoir (e.g., disposable cup, fluid container) or another fluid source 28 using a variety of connections. For instance, the fluid inlet 24 may include a male or female connector 34 that couples to a corresponding male or female connector 36 of the fluid source 28. Further, the connectors 30, 32, 34, 36 may connect using a press fit connection (e.g., male connector inserted into a female connector). In some cases, one or more of the connectors 30, 34 may have a smooth (e.g., non-threaded) interior and/or exterior that fits a corresponding source connector 32, 36.

In some cases, it may be desirable to use a different air source 26 or fluid source 28. However, the connector 30 of the air inlet 22 or the connector 34 of the fluid inlet 24 may not match the air source connector 32 or fluid source connector 36 described above. For instance, the air inlet 22 may include a female snap-fit connection 30 for coupling to a male connector 32 of the air source 26. Accordingly, an adapter 40 may connect the sprayer 12 to the air source 26 or fluid source 28. The adapter 40 may include a sprayer connector 42 and a source connector 44. The sprayer connector 42 couples the adapter 40 to the inlet 22 of the sprayer 12, and the source connector 44 couples the adapter 40 to the connector 32 of the air source 26. Similarly, the fluid inlet 24 may include a connector 34 that does not match a connector 36 of the fluid source 28. Another adapter 40 may include a sprayer connector 42 and a source connector 44 to couple the sprayer 12 with the fluid source 28. Likewise, the sprayer connector 42 may couple the adapter 40 to the sprayer 12, and the source connector 44 may couple the adapter 40 to the fluid connector 36, thereby coupling the fluid source 28 to the sprayer 12.

Figure 2:
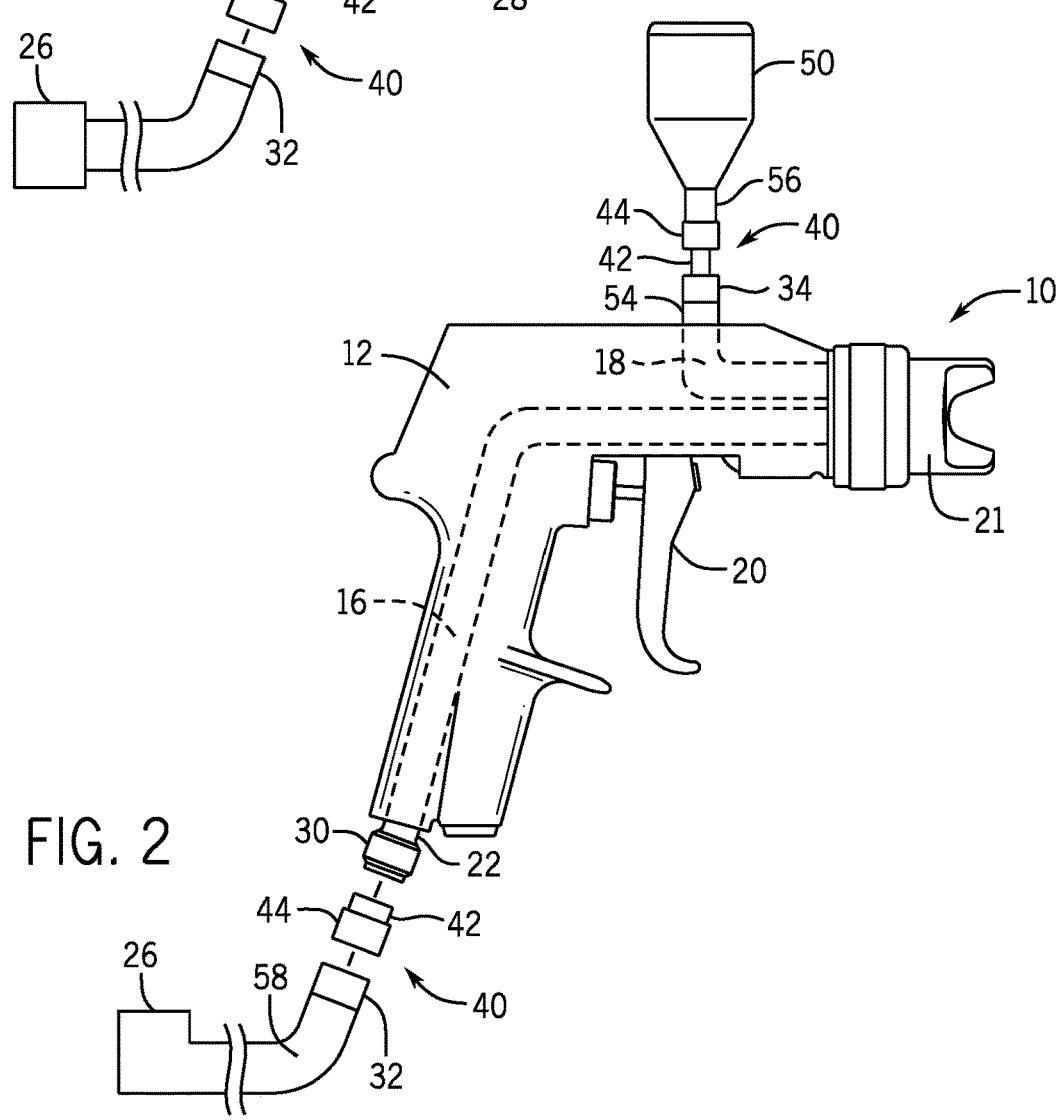
FIG. 2 is a side view of an embodiment of a sprayer system with an adapter.

The sprayer 12 may be any suitable coating device, such as a gravity-feed, siphon, high-volume low-pressure, or pressure spray gun. For example, FIG. 2 illustrates a gravity-feed sprayer system 10 having a sprayer 12 with an adapter 40 that couples a gravity-fed fluid source 50 (e.g., fluid reservoir) to the sprayer 12. In some embodiments, the fluid source 50 may be a disposable cup. In FIG. 2, the sprayer system 10 uses gravity to force fluid from the fluid source 50 through the adapter 40 and into the fluid inlet 54 of the passage 18. The fluid adapter 40 may include a sprayer connector 42 that engages with the connector 34 of the gravity-fed fluid inlet 54 to couple the adapter 40 to the sprayer 12, while the source connector 44 engages a connector 56 of the fluid source 50. The gravity-feed sprayer system 10 may also receive air from an air source 26 coupled with an adapter 40 as described above. Whether the source 26, 28, 50 is connected using a cable 58 or uses a container, such as fluid source 50, the source provides fluid or air to the fluid passage 18 or the air passage 16.

Figure 3:
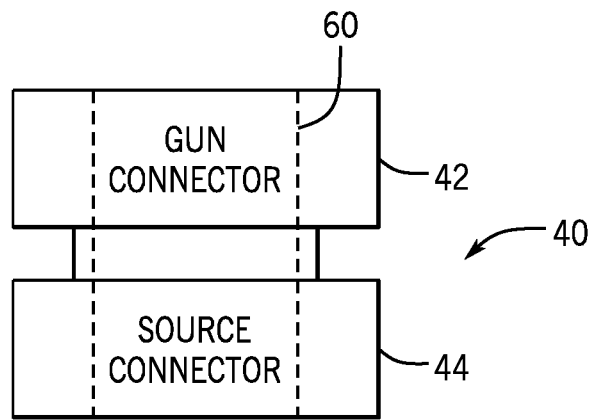
FIG. 3 is a schematic of an embodiment of an adapter.

FIG. 3 is a schematic of an embodiment of a spray-component adapter 40 with a sprayer connector 42 and a source connector 44. As explained above, the sprayer connector 42 of the spray-component adapter 40 connects to the connector 30, 34 on an inlet 22, 24, 54 of the sprayer 12. The adapter 40 includes a source connector 44 that couples the adapter 40 to the connector 32, 36, 56 of the source 26, 28, 50. In certain embodiments, the adapter 40 may include any suitable combination of a male or female sprayer connector 42 and a male or female source connector 44, wherein either one or both of the connectors 42 and/or 44 include a self-tapping portion (e.g., one or more self-tapping features). Accordingly, depending on whether the connectors 42 and 44 are male or female connectors, the self-tapping portion also may be either a male self-tapping portion, a female self-tapping portion, or both. The self-tapping portion may include a self-tapping tip (e.g., a self-drilling tip), self-tapping threads (e.g., threads with a plurality of breaks, variations in geometry, or both along their length), or a combination thereof. Adjacent the self-tapping portion, the connector 42 and/or 44 also may include one or more seals (e.g., annular seals disposed in annular grooves), tapered seal surfaces (e.g., wedge-fit or compression-fit seal surfaces), and/or a tapered tip. These features may further improve the connection and sealing associated with the self-tapping portion of the connector 42 and/or 44. Overall, the adapter 40 provides the benefit of coupling the sprayer 12 to fluid sources (e.g., conduits, containers, etc.) that are otherwise unable to couple due to incompatible couplings.

As noted above, the entire adapter 40, the connector 42, the connector 44, and/or the self-tapping portion (e.g., self-tapping threads) may be made of a relatively harder material (e.g., adapter material) as compared with the material of the coupling on the sprayer 12 and/or the fluid source (e.g., coupling material). For example, the adapter material may be a first material of a first hardness, while the coupling material may be a second material of a second hardness less than the first hardness. The first hardness may be at least 1.5, 2, 3, 4, 5, 6, 7, 8, 9, 10, 15, or 20 times the second hardness. By further example, the adapter material may be metal, while the coupling material may be plastic. By further example, the adapter material may be a first metal of a first hardness, while the coupling material may be a second metal of a second hardness less than the first hardness. By further example, the adapter material may be a first plastic of a first hardness, while the coupling material may be a second plastic of a second hardness less than the first hardness. In certain embodiments, the adapter material (e.g., the self-tapping portion) may include a hard coating or sleeve over a softer material. In certain embodiments, the adapter material may include a stainless steel, an aluminum, a nylon, a ceramic, a carbide (e.g., tungsten carbide), a tool steel, or any combination thereof. The coupling material may include plastic, aluminum, tin, copper, brass, lead, bronze, or other material, generally softer than the adapter material.

As illustrated, the spray-component adapter 40 includes an internal passage 60 that allows fluid or air to flow from the source 26, 28, 50 through the internal passage 60 to the inlet 22, 24, 54 of the sprayer 12. The passage 60 may be a cylindrical or other suitable shape that enables liquids and/or air to pass through the adapter 40. Again, as noted above, the connector 42 and/or 44 and the self-tapping portion on one or both of the connectors 42 or 44 may be an internal feature (e.g., within the internal passage 60), or an external feature (e.g., along an outer circumference on an outer wall surrounding the internal passage 60), or any combination thereof.

Figure 4:
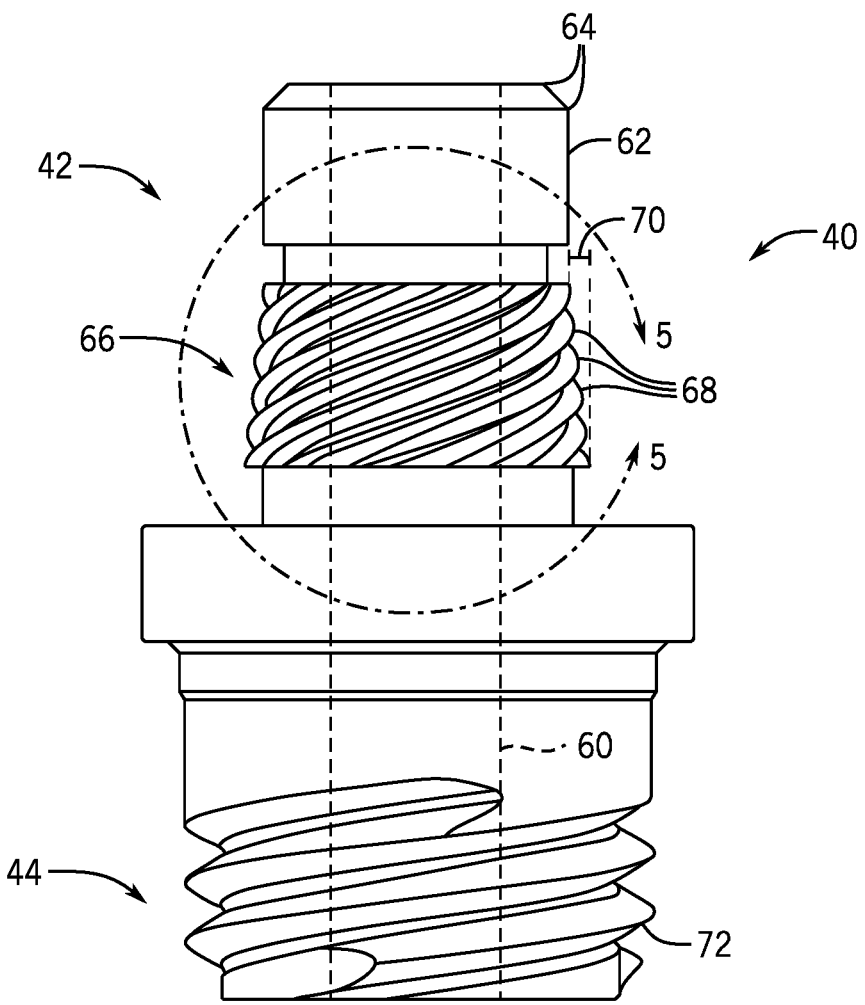
FIG. 4 is a side view of an embodiment of an adapter.

In some cases, the adapter 40 may be configured to self-tap in order to connect the sprayer 12 to the source. FIG. 4 is an example of a self-tapping adapter 40 that is configured to couple the adapter 40 to the sprayer 12 by self-tapping into connector 30 of air inlet 22 or connector 34 of fluid inlet 24, 54 of the sprayer 12. As shown in FIG. 4, the sprayer connector 42 may include a seal portion 62 that is configured to create a fluid or air tight seal. To seal the sprayer 12 to the adapter 40, the seal portion 62 may include a tapered portion 64. In some cases, the tapered portion 64 may correspond to a matching tapered portion of the sprayer 12. For instance, the adapter 40 may include a tapered portion 64 that enables the adapter 40 to engage with various sprayer inlet 22, 24, 54 sizes and shapes.

In order to retain the seal portion 62 within the inlet 22, 24, 54, the adapter 40 may include a self-tapping portion 66. In an embodiment, the self-tapping portion 66 may have one or more sharp spiraling threads 68 that can cut (e.g., rotatably engage) into the air inlet 22 or the fluid inlet 24, 54 (e.g., connector 30 of air inlet 22 or connector 34 of fluid inlet 24, 54). For example, the air inlet 22 or fluid inlet 24 may have a smooth (e.g., non-threaded) interior made of a soft material, such as plastic material or a soft metal (e.g., aluminum, tin, copper, brass, lead, or bronze). As such, the self-tapping portion 54 may be configured to cut into the smooth, soft interior of the inlet 22, 24, 54 by using the sharp spiraling threads 68 of the adapter 40. By self-tapping into the sprayer 12, the adapter 40 can bypass the existing connection and grip the air inlet 22 or fluid inlet 24 to interlock the adapter 40 with the sprayer 12. In some embodiments, the self-tapping portion 66 may include tapered profiles 70 to allow the sprayer connection 42 to interlock the adapter 40 with different sized inlets. In some cases, the tapered profile 70 may seal the sprayer 12 to the adapter 40, with or without the seal portion 62.

As explained above, the adapter 40 includes a source connector 44 that couples to the connectors 32, 36, 56 of the source 26, 28, 50. In some embodiments, the source connector 44 may include threads 72 that threadingly engage corresponding threads on the connector 32 of the air source 26 or the connector 36, 56 of the fluid source 28, 50. The threading 72 may be a single or multi-start thread. As shown in FIG. 4, the threading 72 may be a three start thread. In certain embodiments, the threads 72 may be self-tapping threads that thread into the air inlet 22 or the fluid inlet 24 by rotatably engaging the sharp profiles with the connector 32 of the air source or the connector 36, 56 of the fluid source 28, 50, thereby gripping the connector 32, 36, 56. The operator may then rotate the air source 26 or the fluid source 28, 50 a preset turn (e.g., quarter turn, half turn, whole turn, etc.) with respect to the adapter 40 to threadingly engage the adapter 40 to the source 26, 28, 50. While threading is described with respect to FIG. 4, any suitable connection may be used to couple the source connector 44 to the source 26, 28, 50 (e.g., snap-fit, interference fit, etc.).

Figure 5:
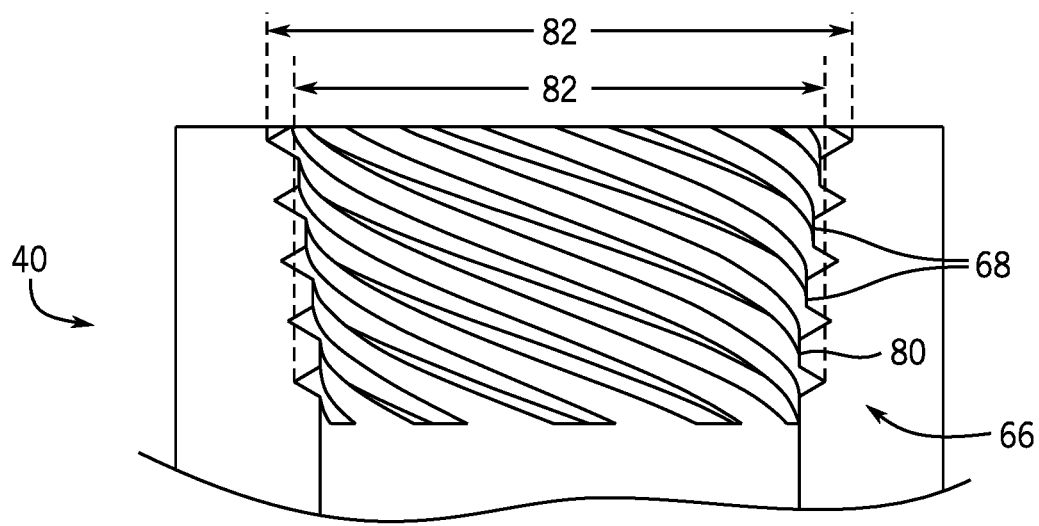
FIG. 5 is a sectional view of an embodiment of an adapter within line 5-5 of FIG. 4.

FIG. 5 shows an example of a self-tapping portion 66 within line 5-5 of FIG. 4 that self-taps the exterior of the connector 30 of the air inlet 22 or connector 34 of fluid inlet 24, 54. The internal self-tapping threads 80 may couple the adapter 40 to the inlet 22, 24, 54 by cutting into the external surface of the inlet 22, 24, 54. Similar to the external self-tapping adapter 40 in FIG. 4, the internal self-tapping adapter 40 may be tapered to better interlock various sprayers 12 to the adapter 40. The exterior of the inlet 22, 24, 54 may be smooth and/or made of a plastic or soft metal to allow the adapter 40 to cut into the exterior.

Figure 6:
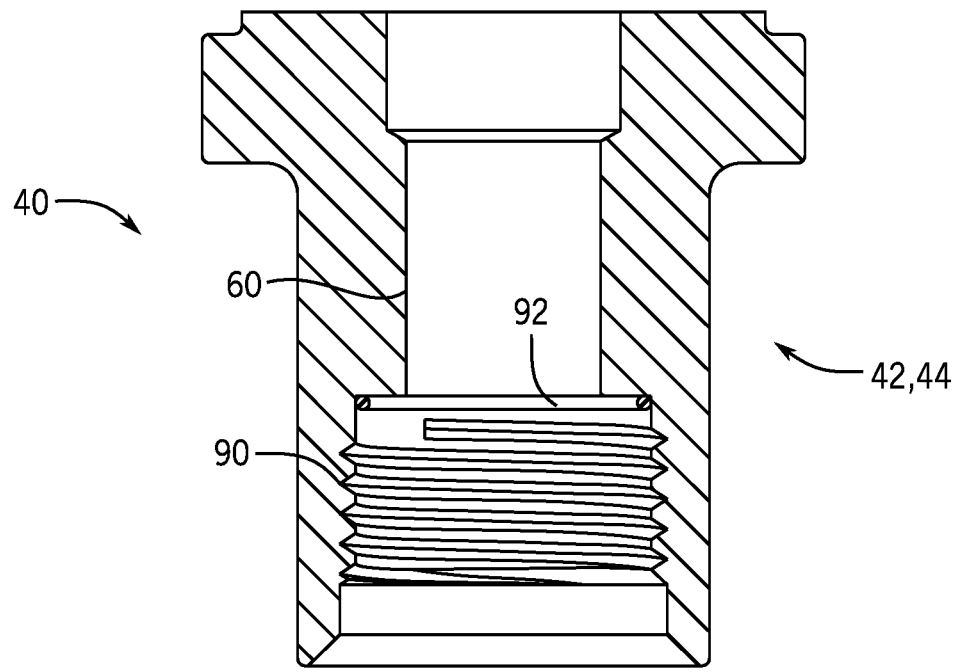
FIG. 6 is a partial cross-sectional view of an embodiment of an adapter with internal threads.

The source connector 44 may connect to the air source 26 or the fluid source 28 using any suitable method, such as an internal interference, external interference, a snap fit, using bearings, seals, or threading. While FIGS. 6-10 are examples of connections between the source and the adapter 40, the source connector 44 may connect using any suitable connection to the source to facilitate sealing the source 26, 28, 50 to the adapter 40 and/or facilitating flow of fluid or air from the source 26, 28, 50 through the adapter 40 to the sprayer 12. For example, FIG. 6 shows an embodiment of a source connector 44 or sprayer connector 42 having internal threads 90. The internal threads 90 may threadingly engage with corresponding external threads of the source. Alternatively, the threads may be self-tapping to allow the source connector 44 to cut into the connector 32, 36, 56 of the source 26, 28, 50. Further, the adapter 40 may include one or more gaskets, such as O-rings or seal beads, on the source connector 44 or the sprayer connector 42. For instance, an O-ring 92 (or sealing bead in place of the O-ring) may be used to create a seal at the interface between the adapter 40 and the source 26, 28, 50 or the sprayer 12. FIG. 6 also shows an example of an internal passage 60, which may have a variety of shapes and sizes.

Figure 7:
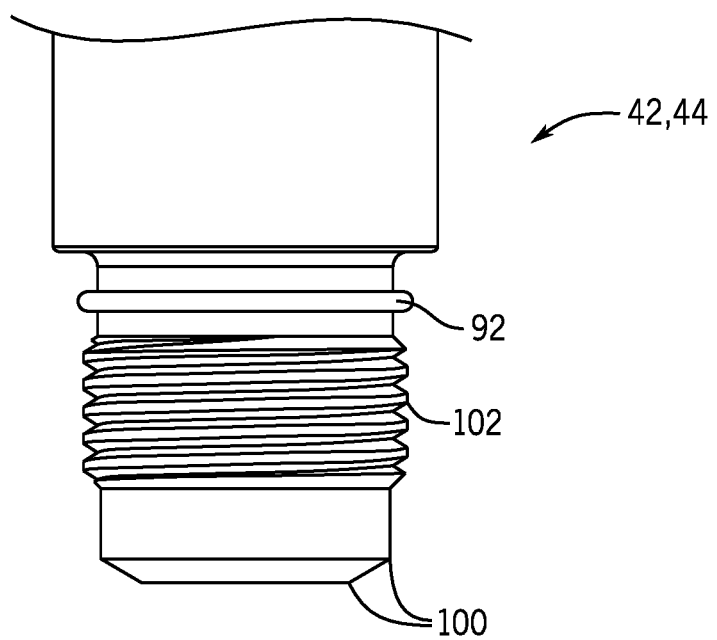
FIG. 7 is a partial side view of an embodiment of an adapter with external threads.

FIG. 7 is another example of a sprayer connector 42 or source connector 44 configured to engage with the air source 26 or the fluid source 28. The adapter 26 may include a tapered edge 100 on the source connector 44 to provide air or fluid tight seal with the source. Further along the longitudinal axis, the adapter 40 may include a different type of threading than the threading 74 of FIG. 4. As mentioned above, the source connector 44 may include one or more O-rings 92 to create a seal with the source 26, 28, 50. The adapter 40 may be configured to receive the O-ring 92 in a recess of the adapter 40 to support the O-ring in a position on the adapter 40. For creating an air or fluid seal with the source 26, 28, 50, sealing beads may be used in place of the O-rings 92.

Figure 8:
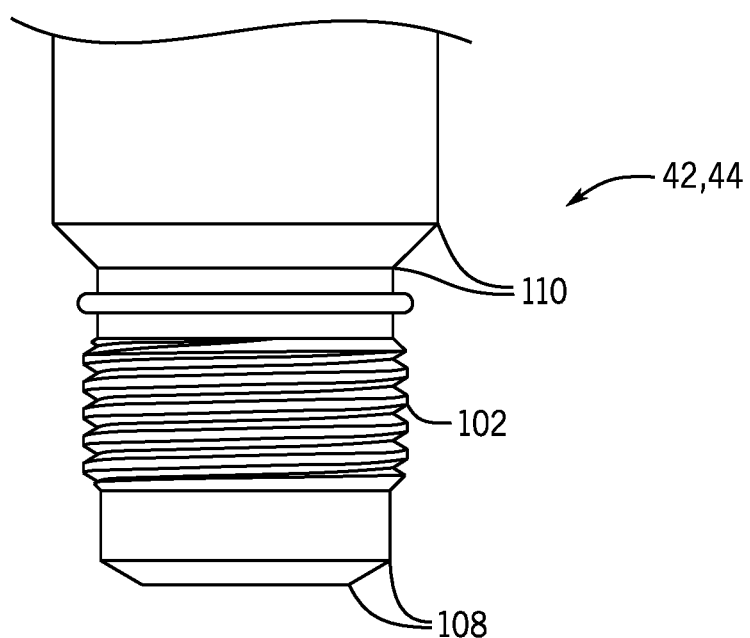
FIG. 8 is a partial side view of an embodiment of an adapter with tapered edges.

FIG. 8 is an example of a sprayer connector 42 or source connector 44 that uses a tapering or an interference fit with the source. The tapered edge 108 may engage a corresponding edge of the connector 32 of the air source 26 or the connector 36 of the fluid source 28 to interlock the adapter 40 with the source 26, 28, 50. Further, the source connector 44 or the sprayer connector 42 may include one or more additional tapered edges 110 that are suitable for providing better connection.

Figure 9:
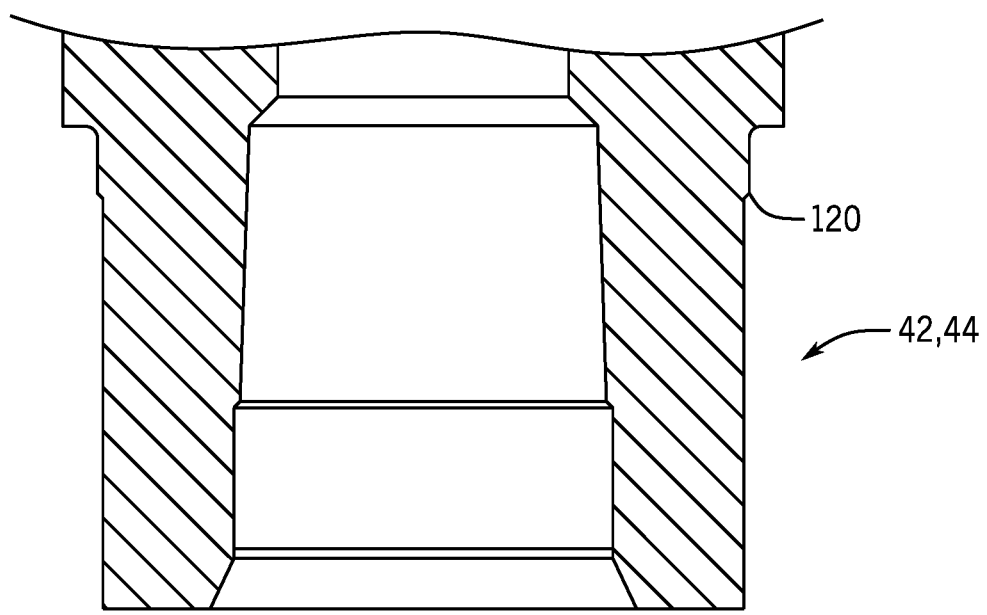
FIG. 9 is a partial cross-sectional view of an embodiment of an adapter with a press-fit.

While many of the examples above involve threading, for instance, a fluid reservoir to the adapter 40, other ways of coupling the reservoir to the adapter 40 may be used. FIG. 9 is an example of a press fit source connector 44 or sprayer connector 42 that uses a fitted edge 120 that fits with an edge of the adapter 40. The adapter 40 couples to the connector 32 of the air source 26 or the connector 36 of the fluid source 28 by an operator pushing the press-fit adapter 40 over a corresponding recess of the source 26, 28, 50.

Figure 10:
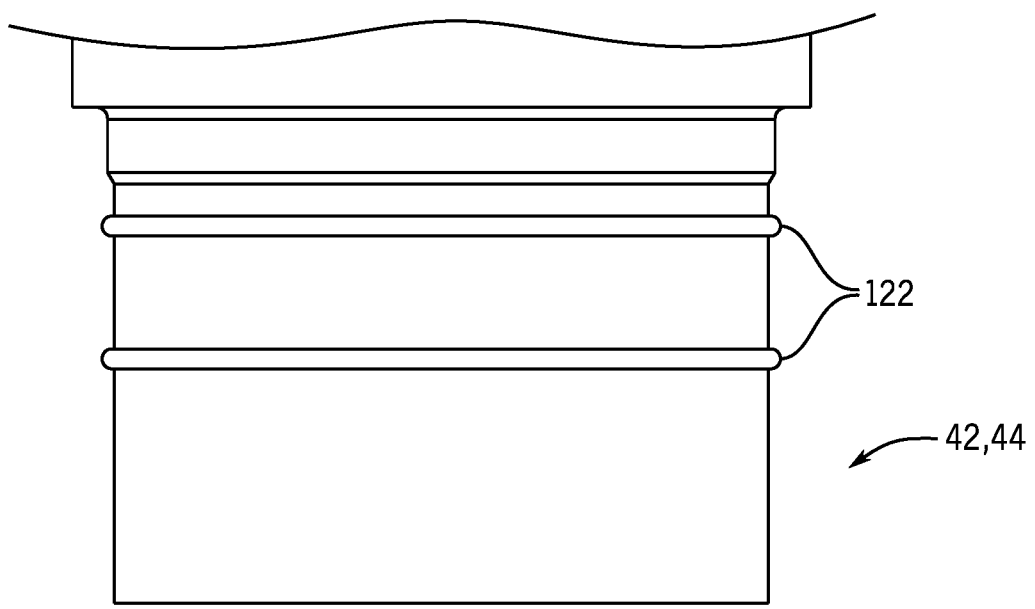
FIG. 10 is a partial side view of an embodiment of an adapter with sealing beads.

FIG. 10 shows an example of a sealing bead source connector 44 or sprayer connector 42 for the adapter 40. The adapter 40 utilizes one or more sealing beads 122 to interlock the source to the adapter 40. Further, the edge of the source connector 44 may be tapered to allow an operator to push the sealing beads 122 into the connector 32 of the air source or the connector 36 of the fluid source 28. For creating an air or fluid seal, O-rings may be used in place of the sealing beads 122.

Figure 11:
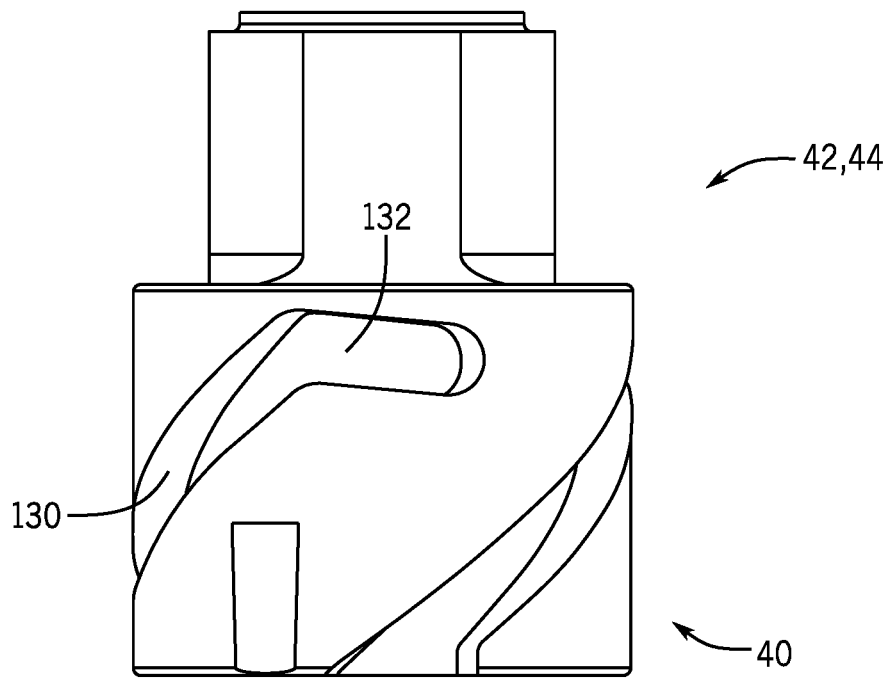
FIG. 11 is a partial side view of an embodiment of an adapter with a non-threaded connection.

In another embodiment, FIG. 11 shows a non-threaded connection for connecting the connector of a source 26, 28, 50 to the adapter 40. The source connector 44 couples to the connector 32 of the air source 26 or the connector 36 of the fuel source 28 by rotatably engaging the source connector 44 with the connector of the source. The apertures 30 interlock with corresponding protrusions of the connector as the operator rotates the connectors with respect to one another. The bend 132 secures the connectors to one another to prevent the connection from separating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a first spray component comprising at least a portion of a fluid cup or a sprayer; and
   a spray-component adapter, comprising:
      a first connector comprising a self-tapping portion configured to couple the spray-component adapter to a first fluid port of the first spray component;
      a second connector configured to couple the spray-component adapter to a second fluid port of a second spray component, wherein the second spray component comprises the other of the fluid cup or the sprayer; and
      a passage extending through the first connector and the second connector, wherein the first connector, the second connector, and the passage extend along a common axis from an inlet to an outlet of the spray-component adapter.

2. The system of claim 1, wherein the first spray component comprises the sprayer.

3. The system of claim 2, wherein the sprayer comprises a spray gun.

4. The system of claim 2, wherein the sprayer comprises a pneumatic sprayer, a rotary bell cup, an electrostatic sprayer, or any combination thereof.

5. The system of claim 1, wherein the first spray component comprises the fluid cup configured to couple to the sprayer via the spray-component adapter.

6. The system of claim 1, wherein the self-tapping portion comprises self-tapping threads.

7. The system of claim 6, wherein the self-tapping threads are disposed along a tapered portion of the self-tapping portion.

8. The system of claim 1, wherein the first connector comprises a seal portion with a tapered end.

9. The system of claim 1, wherein the self-tapping portion is disposed on an exterior, an interior, or a combination thereof.

10. A system, comprising:
    at least one spray component comprising at least a portion of a fluid cup or a sprayer; and
    a spray-component adapter comprising a first connector, a second connector, and a passage extending through the first connector and the second connector, wherein the first connector, the second connector, and the passage extend along a common axis from an inlet to an outlet of the spray-component adapter, wherein the first connector comprises a self-tapping portion configured to couple the spray-component adapter to a fluid port of the at least one spray component, and wherein the first connector comprises a tapered portion.

11. The system of claim 10, wherein the self-tapping portion comprises self-tapping threads disposed along the tapered portion of the first connector.

12. The system of claim 10, wherein at least the self-tapping portion is made of a first material having a first hardness that is greater than a second hardness of a second material of the at least one spray component.

13. The system of claim 10, wherein the fluid port of the at least one spray component comprises a smooth non-threaded surface, and the self-tapping portion comprises self-tapping threads configured to self-tap into the smooth non-threaded surface of the fluid port.

14. The system of claim 10, wherein the at least one spray component comprises the portion of the fluid source.

15. The system of claim 10, wherein the at least one spray component comprises the portion of the sprayer.

16. A method, comprising:
couple a fluid cup to a sprayer using a sprayer adapter, wherein the sprayer adapter comprises a first connector configured to couple the sprayer adapter to the fluid cup or the sprayer with a self-tapping portion of the first connector, and wherein the sprayer adapter comprises a second connector configured to couple the sprayer adapter to the other of the sprayer and the fluid cup, and wherein coupling the fluid cup to the sprayer with the sprayer adapter opens a fluid communication path between the fluid cup and the sprayer through a fluid passage of the sprayer adapter, wherein the first connector, the second connector, and the fluid passage extend along a common axis from an inlet to an outlet of the sprayer adapter.

17. The method of claim 16, wherein coupling comprises self-tapping the sprayer adapter to a fluid port of the fluid cup.

18. The method of claim 16, wherein coupling comprises self-tapping the sprayer adapter to a fluid port of the sprayer.

19. The method of claim 16, wherein coupling comprises self-tapping the sprayer adapter to a fluid port of the fluid cup or the sprayer via self-tapping threads.

20. The method of claim 19, wherein the self-tapping threads are disposed along a tapered portion of the first connector.

* * * * *